United States Patent [19]
Hinton et al.

[11] Patent Number: 5,448,707
[45] Date of Patent: Sep. 5, 1995

[54] MECHANISM TO PROTECT DATA SAVED ON A LOCAL REGISTER CACHE DURING INTER-SUBSYSTEM CALLS AND RETURNS

[75] Inventors: Glenn J. Hinton, Portland; Gyanendra Tiwary, Hillsboro, both of Oreg.

[73] Assignee: Intel Corporation, Santa Clara, Calif.

[21] Appl. No.: 219,408

[22] Filed: Mar. 29, 1994

Related U.S. Application Data

[63] Continuation of Ser. No. 784,570, Oct. 29, 1991, abandoned.

[51] Int. Cl.⁶ .................................. G06F 12/16
[52] U.S. Cl. .................. 395/375; 364/DIG. 1; 364/DIG. 2; 364/243.4; 364/243.41; 364/964; 364/964.2; 364/964.27
[58] Field of Search .......... 395/375, 800, 400, 425; 364/DIG. 1 MS Files, DIG. 2 MS Files

[56] References Cited

U.S. PATENT DOCUMENTS

| | | | |
|---|---|---|---|
| 4,041,462 | 8/1977 | Davis et al. | 395/775 |
| 4,438,492 | 3/1984 | Harmon, Jr. et al. | 395/375 |
| 4,488,227 | 12/1984 | Miu et al. | 395/375 |
| 4,586,130 | 4/1986 | Butts, Jr. et al. | 395/375 |
| 4,811,208 | 5/1989 | Meyers et al. | 395/800 |
| 4,916,660 | 4/1990 | Takahashi | 395/200 |
| 4,961,135 | 10/1990 | Uchihori | 395/400 |
| 5,023,828 | 6/1991 | Grundmann et al. | 395/375 |
| 5,043,870 | 8/1991 | Ditzel et al. | 395/425 |
| 5,157,777 | 10/1992 | Lai et al. | 395/425 |
| 5,210,874 | 5/1993 | Karger | 395/650 |
| 5,214,786 | 5/1993 | Watanabe et al. | 395/800 |
| 5,276,882 | 1/1994 | Emma et al. | 395/700 |

OTHER PUBLICATIONS

"Digital Systems: Hardware Organization and Design 2nd ed." Hill et al. 1978 pp. 512–517.
"Modern Electronic Circuits Reference Manual" Markus 1980 p. 540.

*Primary Examiner*—Robert B. Harrell
*Attorney, Agent, or Firm*—Owen L. Lamb

[57] ABSTRACT

An apparatus for protecting the data in a local register cache during calls and returns that cross subsystem boundaries. The left most bit of a shift register is set to a 1 if a "set boundary bit" instruction is detected. A subsequent PUSH instruction shifts the shift register right one bit. A POPTOS1 instruction in the instruction flow signifies an intra-subsystem return and causes the leftmost bit of the shift register to be checked to see if it is a zero. A protection fault is signalled upon the condition that the leftmost bit is not equal to zero. The shift register is shifted left one bit upon the condition that a POPSTOS 2 instruction is detected. A POPSUB1 instruction detected in the instruction flow signifies an inter-subsystem return and causes the leftmost bit of the shift register to be checked to see if it is a one. A a protection fault is signalled upon the condition that the leftmost bit is not equal to zero. The register is shifted left one bit upon the condition that a POPSTOS 2 instruction is detected in the instruction flow.

6 Claims, 4 Drawing Sheets

MECHANISM TO PROTECT DATA SAVED ON A LOCAL REGISTER CACHE DURING INTER-SUBSYSTEM CALLS AND RETURNS

This application is a continuation of application Ser. No. 07/784,570 filed Oct. 29, 1991, now abandoned.

CROSS REFERENCES TO RELATED APPLICATIONS

This application is related to the following copending patent application "A Pipelined Microprocessor in Which Multiple Functions are Performed During Each Pipeline Stage" Ser. No. 07/630,499, filed Dec. 20, 1990, now U.S. Pat. No. H001219 and "Instruction Fetch Unit in a Microprocessor That Executes Multiple Instructions in One Cycle and Switches Program Streams Every Cycle" Ser. No. 6/630,498, filed Dec. 20, 1990, now abandoned both assigned to Intel Corporation.

BACKGROUND OF THE INVENTION

1. Field of the Invention

The invention relates to data processing systems and more particularly to a method and apparatus for protecting intersubsystem calls and returns that cross subsystem boundaries.

2. Description of the Related Art

As microprocessors become faster, the traffic between the microprocessor chip and off-chip main memory increases causing a performance bottleneck. As described in U.S. Pat. No. 4, 811,208 entitled "Stack Frame Cache on a Microprocessor Chip" this bottleneck has been lessened by using a local on-chip memory (called a cache) to store frequently used memory data. If data required by the processor is in the cache, an off-chip memory reference is avoided since the data can be fetched directly from the cache. Further reductions in memory traffic are achieved because the cache design is expanded to include instruction fetches. Information relating to call and return instructions is available locally on the chip, so most call and return instructions execute without references to the off-chip memory. The resulting decreased memory bus traffic also reduces the probability that a load or store instruction will have to wait for the memory bus.

A plurality of global registers are provided on the microprocessor chip. One of the global registers is a frame pointer register containing the current frame pointer. The remainder of the global registers are available to a current process as general registers. A stack frame cache mechanism is provided comprised of a register set pool made up of a plurality of register sets, each register set being comprised of a number of local registers on the chip. When a call instruction is decoded, a register set from the register set pool is allocated to the called procedure, and the frame pointer register is initialized. When a return instruction is decoded, the register set is freed for allocation to another procedure called by a subsequent call instruction. If the register set pool is depleted, the contents of a register set associated with a previous (the least recent) procedure are saved in the main memory, and that register set is allocated to the current procedure. The local registers of a register set associated with a procedure contain linkage information including a pointer to the previous frame and an instruction pointer, thus enabling most call and return instructions to execute without needing any references to off-chip memory. This significantly reduces the saving and restoring of registers that must be done when crossing subroutine boundaries. Since the local register sets are mapped into the stack flames, the linkage information that normally appears in stack flames (e.g., pointer to previous frame, saved instruction pointer) is contained in the local registers. This means that most call and return instructions execute without causing any references to off-chip memory.

During intersubsystem calls and returns, it is required that the local registers saved onto the on-chip local register cache or stack by one subsystem should not be accessible to another subsystem. If there is no protection mechanism, then the data "pushed" onto the local register stack-frame cache during a subsystem call can be "popped" out by the new process.

It is therefore an object of the present invention to provide a method and apparatus for protecting intersubsystem calls and returns that cross subsystem boundaries.

SUMMARY OF THE INVENTION

Briefly, the above object is accomplished in accordance with the invention by providing a shift register in which the left most bit of the shift register is set to a 1 if a "set boundary bit" instruction is detected. The "set boundary bit" instruction is placed in the instruction stream of an inter-subsystem call. A subsequent PUSH instruction shifts the shift register right one bit as data are pushed onto the stack. A POPTOS1 instruction in the instruction flow signifies an intra-subsystem return. The leftmost bit of the shift register is checked to see if it is a zero. A protection fault is signalled upon the condition that the leftmost bit is not equal to zero. The shift register is shifted left one bit upon the condition that a POPSTOS 2 instruction is detected. A POPSUB1 instruction detected in the instruction flow signifies an inter-subsystem return. The leftmost bit of the shift register is checked to see if it is a one. A a protection fault is signalled upon the condition that the leftmost bit is not equal to one. The register is shifted left one bit upon the condition that a POPSTOS 2 instruction is detected in the instruction flow.

BRIEF DESCRIPTION OF THE DRAWINGS

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
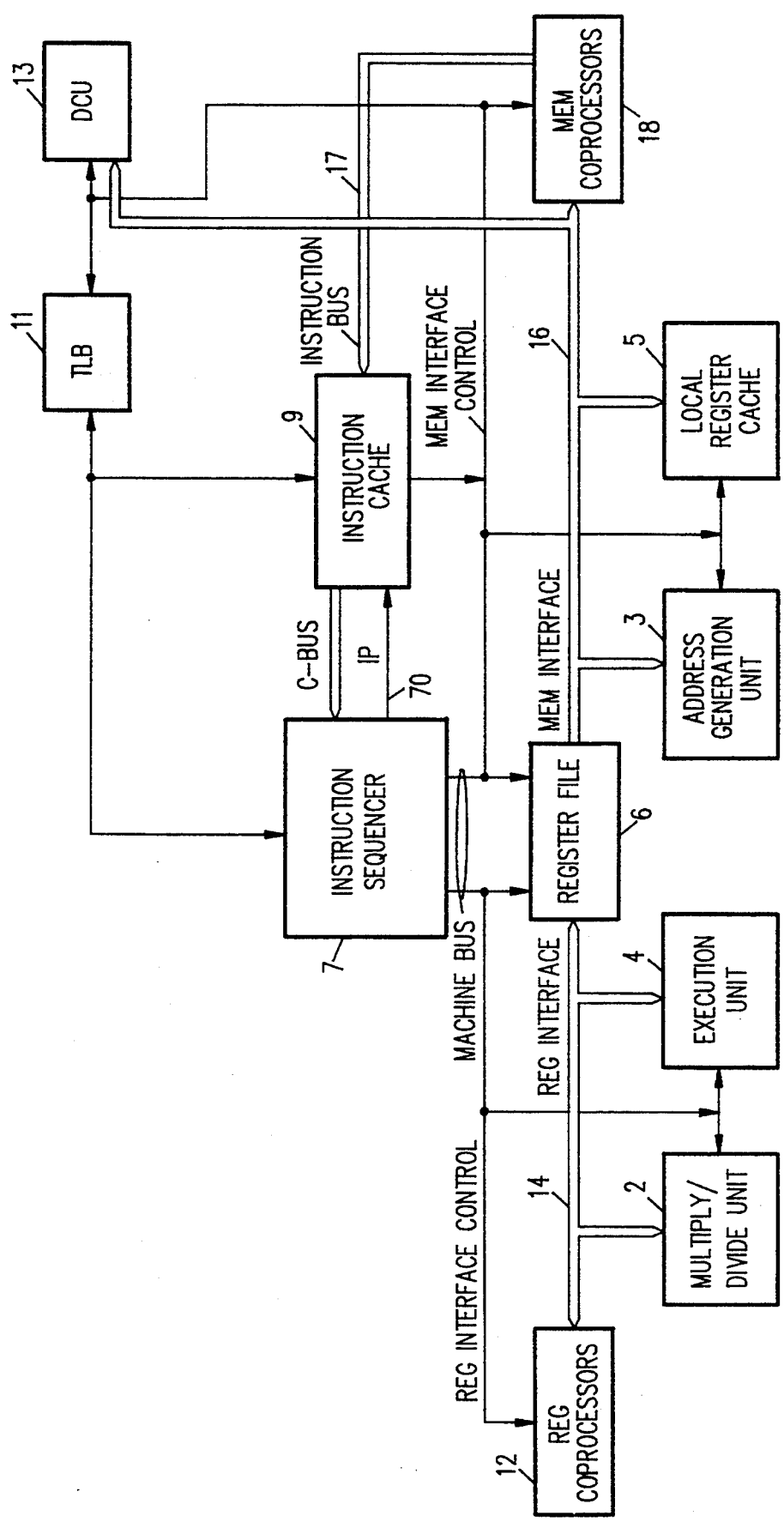
FIG. 1 is a functional block diagram of a microprocessor in which the present invention is embodied.

Referring to FIG. 1, the microprocessor in which the present invention is embodied is briefly described below. For more detailed information refer to the above-identified copending application Ser. No. 07/630,499. Instruction Cache and ROM (I-Cache)

This unit (9) provides the Instruction Sequencer (7) with instructions every cycle. It contains a 2-way set-associative instruction cache and a microcode ROM. The ROM is an always-hit portion of the cache. The I-Cache is four words wide and is capable of supplying four words per clock to the Instruction Sequencer (IS). The I-Cache also contains the external fetch handling logic that is used when an instruction fetch misses the I-Cache.

Instruction Sequencer (IS)

The IS (7) decodes the instruction stream and drives the decoded instructions onto the machine bus. The instruction sequencer (7) decodes the incoming four instruction words from the Cache (9). The instruction sequencer detects dependencies between the instructions and issues as many instructions as it can per clock.

Register File (RF)

The RF (6) has 16 local and 16 global registers. The RF has 4 independent read ports and 2 independent write ports to support the machine parallelism.

Execution Unit (EU)

The EU (4) performs all the simple integer and ordinal operations of the microprocessor in which the present invention is embodied.

Multiply-Divide Unit (MDU)

The MDU (2) performs the integer/ordinal multiply, divide, remainder, and modulo operations.

Address Generation and Execution Unit (AGEU)

The AEGU (3) is used to do the effective address calculations in parallel with the integer execution unit. It performs the load-effective-address instructions (LDA) and also does the address computations for loads and stores. When the AGEU is not doing address calculation it ca also be used as a second execution unit.

Local Register Cache (LRC)

The LRC (5) maintains a stack of eight 16-word local register sets. On each call the 16 local registers are transferred from the RF to the LRC. This allocates the 16 local registers in the RF for the called procedure. On a return the 16 words are transferred back into the RF to the calling procedure.

Translation Lookaside Buffer or TLB

The Translation Lookaside Buffer (TLB-11) is used by an instruction fetch unit within the IS (7) for mapping logical addresses to physical addresses.

Data Cache Unit or DCU

The Data Cache Unit (DCU-13) is a 2K byte physical write-through data cache with a line size of 16 bytes. It is connected to the RF by a 128 bit-wide bus so that up to 16 bytes can be transferred in a single clock cycle.

REG and MEM Interfaces

The REG interface (14) is where all of the REG format instructions are executed. One instruction per clock can be issued on the REG interface. The operations can be single or multi-cycle as long as they are independently sequenced by the respective REG coprocessor (12). The coprocessors on this interface arbitrate among themselves if necessary to return their results.

The MEM interface (16) is where all MEM format instructions are executed. It also connects the system to the memory coprocessor (18). The on-chip memory coprocessor can be a bus controller (BCU) that connects to off-chip memory. One instruction per clock can be issued on this interface. The operations can be single or multi-cycle just as described above for the REG interface. The coprocessors on this interface arbitrate among themselves if needed to return their results.

Stack Frame Cache

A process sees a flat linear address space, addressed with 32-bit ordinals, out of which it allocates data, instruction, and stack space. A call instruction creates a new stack frame (activation record) on a sequentially allocated stack.

The instruction set of the microprocessor is similar in design to those of RISC (reduced instruction-set computer) machines. All instructions are 32-bits in length and must be aligned on word boundaries, and only load, store, and branching instructions reference memory, all others reference registers.

The execution environment consists of a $2^{**}32$ byte linear address space and thirty six registers. Of the thirty six registers, 16 are 32-bit global registers, sixteen are 32-bit local registers, and the remaining four are 80-bit floating-point registers. The local registers are associated with a mechanism known as the stack-frame cache. When a procedure is called, a new set of local registers are allocated from a pool of on-chip registers, and are freed by a procedure return. Eight sets of local registers are provided.

The register file (RF) consists of 16 global registers and 4 floating-point registers that are preserved across procedure boundaries, and multiple sets of 16 local (or frame) registers that are associated with each stack frame. At any point in time, one can address thirty-two 32-bit registers, and four 80-bit floating-point registers (the 32 registers can also be used to hold floating-point values). Of the 32 registers, 16 are global registers and 16 are local registers. The difference is that the 16 global registers are unaffected when crossing procedure boundaries, i.e., they behave like "normal" registers in other processors. The local registers are affected by the call and return instructions.

When a call instruction is executed, the processor allocates to the called procedure a new set of 16 local registers from the on-chip pool of eight register sets. If the processor's eight-set pool is depleted, the processor automatically reallocates a register set by taking one register set associated with an earlier procedure and saving the contents of that register set in memory. The contents of the earlier procedure's register set are saved in the first 16 words of that procedure's stack frame in memory. Because of this, the mechanism is named the stack frame cache. The return instruction causes the current local register set to be freed for use by a subsequent call.

There are sixteen global registers G0 . . . G15 associated with a process; they are saved in the process control block when the process is not executing. Global registers are not associatively mapped into the process control block.

Of the sixteen 32-bit registers, G15 contains the current frame pointer (FP) and G0 . . . G14 are general-purpose registers. The FP contains the linear address (pointer) into the current execution environment for the current (topmost) stack frame. Since stack frames are aligned to 64-byte boundaries, the low-order 6 bits of FP are ignored and always interpreted to be zero. This register is updated on calls and restored on returns.

Instruction Pointer

The Instruction Pointer is a linear address (pointer) into the current linear address space to the first byte of the current instruction. Since instructions must begin on word (4-byte) boundaries, the two low-order bits of IP are ignored and assumed to be 0.

Local (or Frame) Registers

Registers L0 ... L15, the local registers, are associated with the first 16 words of the current frame. Thus, register L0 is mapped into linear address FP+0 to FP+3, register Li is mapped into linear address FP+4i to FP+4i+3, and so on. These registers only get placed in the stack frame if they are stored to memory on a stack cache overflow.

A cache of multiple stack frames is provided. There are multiple banks of high-speed registers, one bank per procedure activation. The program does not have to save and restore registers explicitly.

Stack Frame

The stack frame is a contiguous portion of current linear address space, containing data in a stack-like fashion. There is one stack frame per activated procedure, which contains local variables, parameters, and linkage information. A call operation acquires a new stack frame; a return operation releases it. When a new frame is acquired, it is aligned on a 64-byte boundary.

Protection Mechanism

Associated with each execution environment is a boundary bit which acts as a boundary between the data saved on the stack of one subsystem and on the stack of another subsystem. All data between boundaries can be accessed by local calls and returns, whereas data across the boundary bit can only be accessed by using inter-subsystem calls and returns.

A 9-bit shift register is provided which shifts data in or out based on the following conditions:

TABLE I

| INSTRUCTION | ACTION | COMMEND |
|---|---|---|
| push | A zero is shifted right. | This is the first instruction of a CALL |
| pusht | No action on the shift register. | This is the second instruction of a CALL |
| stcp 0 | Sets the leftmost bit to one. | Called the "set boundary bit" instruction |
| poptos1 | Checks the left most bit for a 0. Otherwise signals a protection fault. | Illegal access to data stored by another process |
| popsub1 | Checks the left most bit for a 1. Otherwise signals a protection fault. | Illegal access to data stored by another process |
| poptos2 | Does a shift left by one bit. | This is the second instruction of a 2 clock return |

An intra-subsystem Call, that is, a simple linear procedure call within a subsystem, consists of a "push" followed by a "pusht" instruction in its microflow. It's corresponding Return consists of a "poptos1" instruction followed by a "poptos2" in its microflow. As long as the logic shifts right "zeros" during normal pushes, the logic shifts left the "zeros" during corresponding pops. The intra-subsystem Call logic does not indicate a fault as long as this happens.

During an inter-subsystem call (CALLD) the instruction "stcp 0" is a part of its microflow. This instruction sets the left-most bit to a "1." Once in this new subsystem, any further "pushes" shift-right this one bit and "pops" (i.e., poptos2) shift the one bit left. On a Subsystem Return, the microflow issues a popsub1 instruction which is used by the Subsystem Call logic to check for the leftmost bit to be a "1." If the leftmost bit is a "0", a protection fault is signalled.

Figure 2:
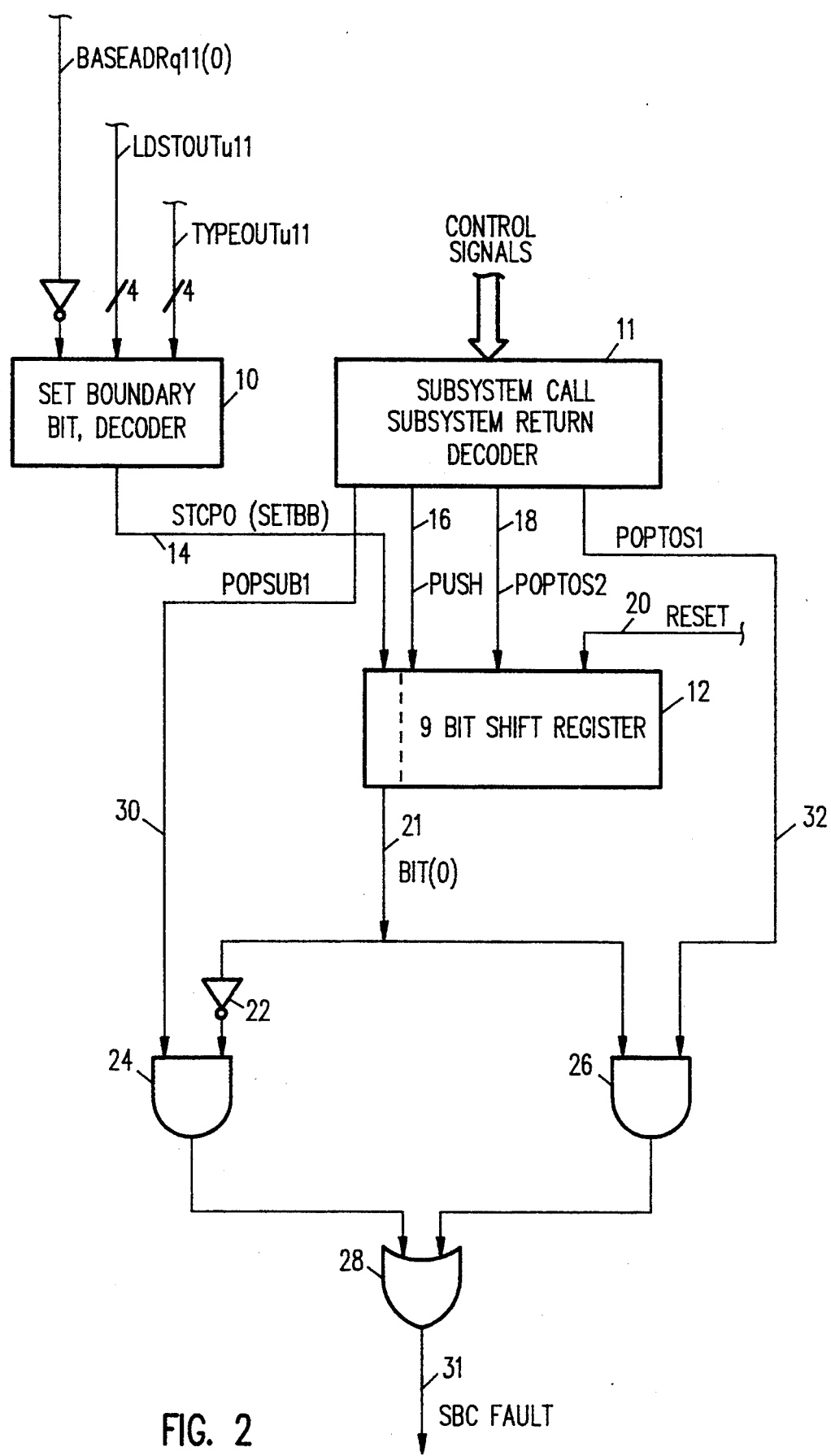
FIG. 2 is a functional block diagram of the subsystem call logic within the Address Generation and Execution Unit of FIG. 1.

FIG. 2 is a block diagram of the Subsystem Call Logic. Block (10) shows the inputs required for the decode of the control signals for stcp0. Similarly, the other control signals (i.e., for POPSUB1, POPTOS1, PUSH, POPTOS2) are decoded at decoder (11).

The shift register (12) is 9 bits wide and is implemented using T-gates and inverters. The left-most bit, BIT[0], of this shift register is written to by stcp0, known as the Set Boundary Bit, or SETBB instruction. A PUSH instruction performs a shift right (16), a POPTOS2 instruction does a shift left (18), and the RESET line (20) clears the shift register.

BIT[0] is read out (21), inverted (22), and ANDed (24) with POPSUB1 (30) whenever a Subsystem Return is decoded. If BIT[0] is not a "1" then the SBCFAULT (Subsystem Boundary Crossed fault) signal (34) goes high, indicating a protection fault. Similarly, during a normal return (i.e., an intrasubsystem return), POPTOS1 is ANDed with BIT[0]. If BIT[0] is a "1" at this time then again a protection fault is signaled.

Figure 3:
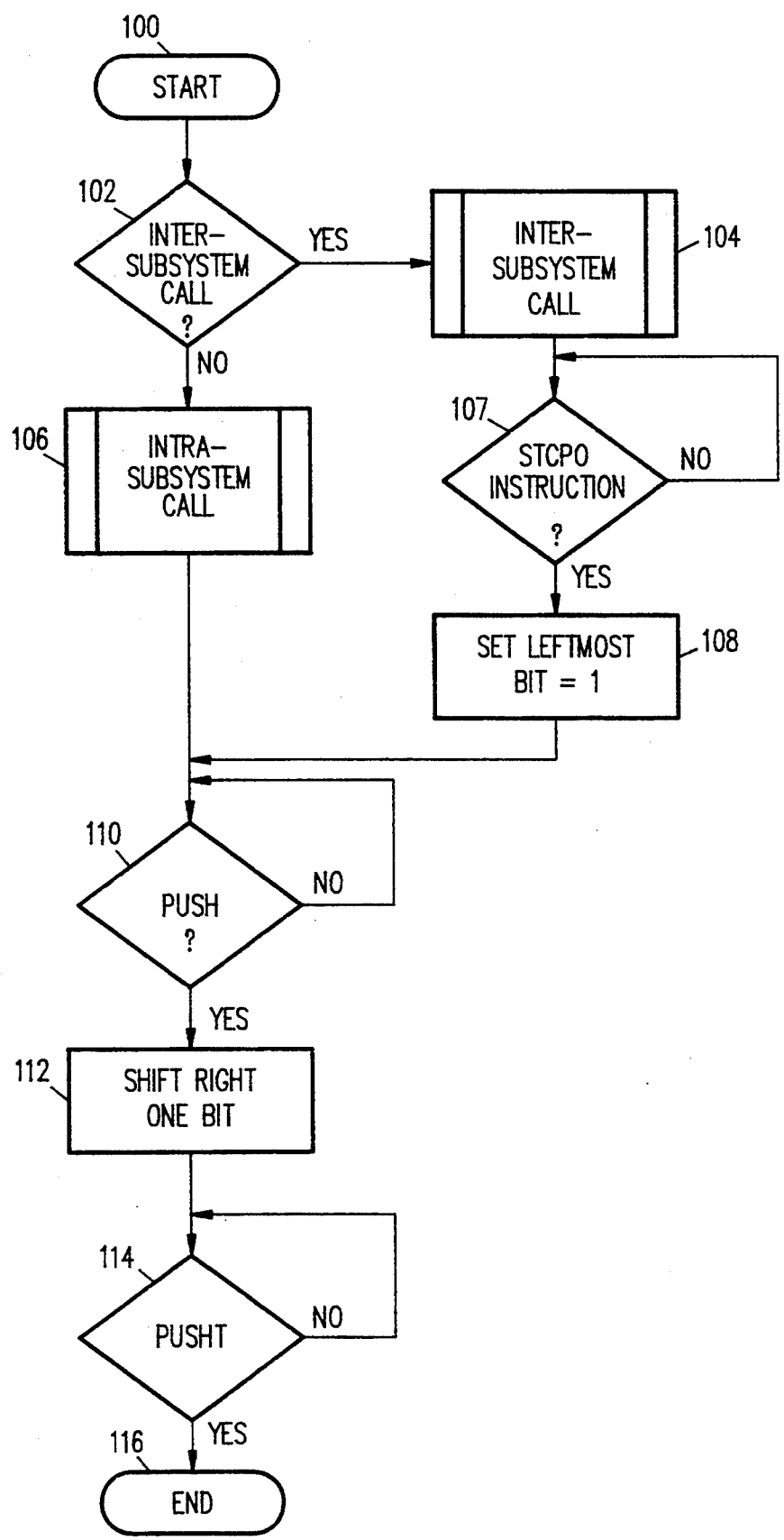
FIG. 3 is a flow chart of a CALL instruction sequence.

FIG. 3 is a flow chart of a procedure CALL operation. The "set boundary bit" instruction STCP0 is part of the flow for an inter-subsystem call. At decision block (102) is a STCP0 is detected and the logic sets the left most bit to a 1 (104). If a STCP0 is not detected, the left most bit is left unchanged. The next instruction in a CALL is a PUSH. This shifts the register right one bit. This is followed by the PUSHT instruction which has no effect on the shift register, and the flow for a CALL ends.

Figure 4:
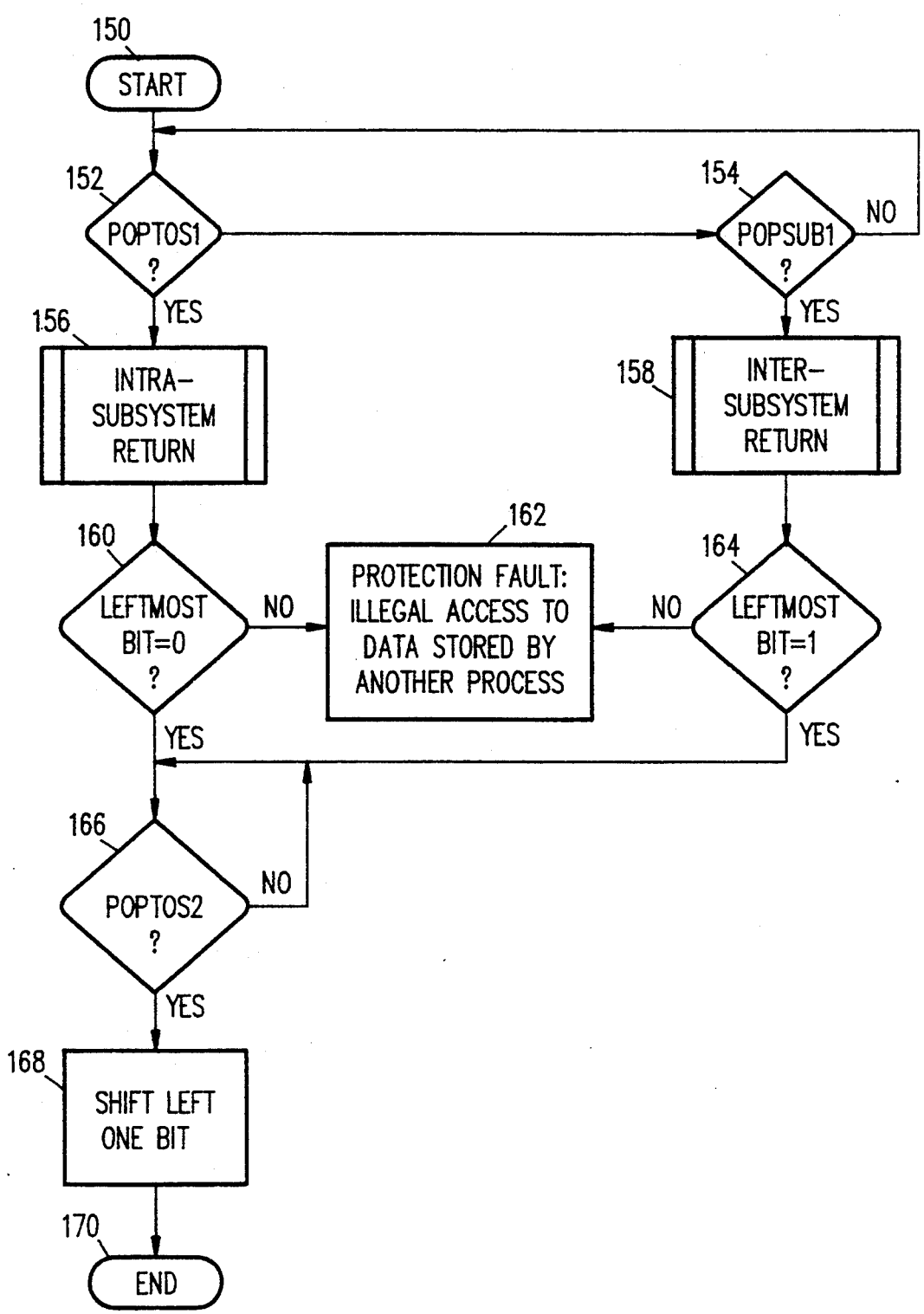
FIG. 4 is a flow chart of a RETURN instruction sequence.

FIG. 4 is a flow chart of a procedure RETURN operation. If a POPTOS1 instruction is detected in the instruction flow (152), this is an intra-subsystem return (156). The leftmost bit in the shift register is checked to see if it is a zero (160). If not, a protection fault is signalled as this is an illegal access to data stored by another process. When a POPSTOS 2 instruction is detected, it causes the shift register to shift left one bit.

If a POPSUB1 instruction is detected in the instruction flow (154), this is an inter-subsystem return (158). The leftmost bit in the shift register is checked to see if it is a one (164). If not, a protection fault is signalled as this is an illegal access to data stored by another process. When a POPSTOS 2 instruction is detected, it causes the shift register to shift left one bit.

While the invention has been particularly shown and described with reference to preferred embodiments thereof, it will be understood by those skilled in the art that the foregoing and other changes in form and detail may be made therein without departing from the scope of the invention.

What is claimed is:

1. A method of protecting intersubsystem calls and returns that cross subsystem boundaries comprising steps of:

A. Detecting a "set boundary bit" instruction as part of a first instruction flow for an inter-subsystem call;

B. Setting a left most bit of a shift register to a 1 upon a first condition that said "set boundary bit" instruction is detected;

C. Detecting a first instruction signifying an intra-subsystem call;

D. Asserting a PUSH line in response to said detecting said first instruction;

E. Shifting said shift register right one bit upon a second condition that said PUSH line is asserted;

F. Detecting a second instruction signifying an intra-subsystem return;

G. Asserting a POPTO2 line in response to said detecting said second instruction;

H. Checking said leftmost bit of said shift register for a zero;

I. Signaling a protection fault upon a condition that said leftmost bit is not zero; and, J. Shifting said register shift left one bit upon a condition that a third instruction following said second instruction is detected.

2. The method in accordance with claim 1 further comprising steps of:

K. Detecting a fourth instruction in a second instruction flow signifying an inter-subsystem return;

L. Checking said leftmost bit of said shift register for a one; and,

M. Signaling a protection fault upon a condition that said leftmost bit is not a one.

3. An apparatus for protecting intersubsystem calls and returns that cross subsystem boundaries comprising:

a shift register;

first decoder means connected to said shift register for detecting a "set boundary bit" instruction as part of the flow for an inter-subsystem call;

second means connected to said first decoder means and to said shift register for setting a left most bit of said shift register to a 1 if said "set boundary bit" instruction is detected;

multiple decoder means for detecting an intra-subsytem call instruction, an intra-subsytem return instruction, and a first instruction following said intra-subsytem return instruction;

a PUSH line connected between said multiple decoder means and said shift register;

a POPTOS2 line connected between said multiple decoder means decoder and said shift register;

right shift means connected to said multiple decoder means for shifting said shift register right one bit upon detection of said intra-subsytem call instruction;

zero bit comparison means, connected to said shift register and to said multiple decoder means, for checking said leftmost bit of said shift register for a zero;

inter-subsytem return fault detection means connected to said zero bit comparison means for signaling a protection fault upon a first condition that said leftmost bit is not zero concurrently with a detection of said inter-subsystem return instruction by said multiple decoder means; and, left shift means connected to said multiple decoder means for shifting said register shift left one bit upon detection of said first instruction following said intra-subsytem return instruction.

4. The apparatus in accordance with claim 3 wherein said multiple decoder means further includes means for detecting an inter-subsystem return instruction and said fourth means includes ninth means for detecting a POP-SUB1 instruction in the instruction flow signifying an inter-subsystem return; said apparatus further comprising:

one bit comparison means connected to said shift register and to said multiple decoder means, for checking said leftmost bit of said shift register for a one; and, intra-subsytem return fault detection means connected to said one bit comparison means for signaling a protection fault upon a second condition that said leftmost bit is not zero.

5. An apparatus for protecting inter subsystem calls and returns that cross subsystem boundaries comprising:

a subsystem call subsystem return decoder;

a shift register connected to said subsystem call subsystem return decoder;

a PUSH line connected between said subsystem call subsystem return decoder and said shift register;

a POPTOS2 line connected between said subsystem call subsystem return decoder and said shift register;

said subsystem call subsystem return decoder first logic that asserts said PUSH line upon a decoding of a subsystem call instruction;

said subsystem call subsystem return decoder including second logic that asserts said POPTOS2 line upon a decoding of a subsystem return instruction;

a set boundary bit decoder;

a stcp0 line connected between said set boundary bit decoder and said shift register;

said set boundary bit decoder including a third logic that detects a set boundary bit instruction as part of a flow for an inter-subsystem call and asserts said stcp0 line in response a detection of said set boundary bit instruction;

assertion of said stcp0 line causing a leftmost bit of said shift register to be set;

assertion of said PUSH line causing said shift register to shift right one bit position;

assertion of said POPTOS2 line causing said shift register to shift left one bit position;

said subsystem call subsystem return decoder including a fourth logic that asserts said POPTOS2 line upon a decoding of said POP instruction;

said subsystem call subsystem return decoder including a fifth logic that asserts said PUSH line upon a decoding of said PUSH instruction;

a bit 0 line output from said shift register;

said bit 0 line being asserted upon a first condition that said 0 bit of said shift register is a 0 and being unasserted upon a second condition that said 0 bit of said shift register is a 1; and, a comparison logic connected to said bit 0 line, to said POPTOS2 line and to said PUSH line;

said comparison logic including a fault line output;

said comparing logic comparing said POPTOS2 line and said PUSH line with said bit 0 line, said fault line being asserted upon a condition that said POPTOS2 line is asserted and said bit 0 line is not asserted and upon a condition that said PUSH line is asserted and said bit 0 line is asserted.

6. The apparatus in accordance with claim 5 wherein said subsystem call subsystem return decoder further includes means for detecting an inter-subsystem return instruction and for detecting a POPSUB1 instruction in the instruction flow signifying an inter-subsystem return; said apparatus further comprising:

one bit comparison means connected to said shift register and to said subsystem call subsystem return decoder; and, intra-subsystem return fault detection means connected to said one bit comparison means for signaling a protection fault upon a condition that said leftmost bit is not zero.

* * * * *